(12) United States Patent
Barber

(10) Patent No.: US 6,725,619 B1
(45) Date of Patent: Apr. 27, 2004

(54) SIDING CLIP FOR SUPPORTING A PANEL

(76) Inventor: Alan E. Barber, 1075 S. Auburn St., #28, Colfax, CA (US) 95713

(*) Notice: Subject to any disclaimer, the term of this patent is extended or adjusted under 35 U.S.C. 154(b) by 0 days.

(21) Appl. No.: 10/092,142

(22) Filed: Mar. 4, 2002

(51) Int. Cl.[7] .............................. E04B 1/38; E04B 2/30; E04D 1/34; E04C 1/00
(52) U.S. Cl. .................... 52/712; 52/714; 52/489.2; 52/548; 52/100
(58) Field of Search .................. 52/712, 478, 489.1, 52/489.2, 520, 543, 548, 714, 98, 100

(56) References Cited

U.S. PATENT DOCUMENTS

| | | | | |
|---|---|---|---|---|
| 1,737,100 A | * | 11/1929 | Thurman | 52/359 |
| 2,019,095 A | * | 10/1935 | Robinson | 52/483.1 |
| 2,066,813 A | * | 1/1937 | Williams | 411/458 |
| 3,189,137 A | * | 6/1965 | Harris | 52/765 |
| 3,365,222 A | * | 1/1968 | Polyak | 403/384 |
| 3,601,428 A | * | 8/1971 | Gilb | 403/232.1 |
| 3,703,304 A | * | 11/1972 | Losee | 411/462 |
| 4,448,007 A | * | 5/1984 | Adams | 52/489.2 |
| 4,466,225 A | * | 8/1984 | Hovind | 52/731.9 |
| 4,584,813 A | * | 4/1986 | Hudson | 52/742.15 |
| 4,782,642 A | * | 11/1988 | Conville | 52/770 |
| 4,995,605 A | * | 2/1991 | Conville | 52/770 |
| 5,054,755 A | * | 10/1991 | Hawkes | 269/3 |
| 5,797,694 A | * | 8/1998 | Breivik | 403/231 |
| 6,293,061 B1 | * | 9/2001 | Horak, Jr. | 52/213 |
| 6,334,287 B1 | * | 1/2002 | Fick | 52/745.11 |
| 2002/0174618 A1 | * | 11/2002 | Carroll | 52/520 |

* cited by examiner

Primary Examiner—Brian E. Glessner
Assistant Examiner—Kevin McDermott
(74) Attorney, Agent, or Firm—Robert Samuel Smith

(57) ABSTRACT

A bracket for aiding in the mounting of a course of wallboards onto a frame of vertical studs including a channel having a short leg joined to a long panel and a punched out nailer extending from the long panel. First, the pointed free end of the nailer is driven into a stud permitting the user to check alignment of a row of the brackets before permanently securing each bracket to its respective stud by driving nails through apertures in the bracket into the stud. The board is then supported in the bracket against the stud and nailed to the stud. The bracket has a line of perforations that permits snapping the exposed part of the bracket from the stud.

2 Claims, 3 Drawing Sheets

1. PROVIDE BRACKETS

2. ERECT FRAME OF STUDS

3. SNAP A CHALK MARKING LINE ON THE STUDS

4. DRIVE THE NAILER OF EACH BRACKET INTO THE RESPECTIVE STUD CAREFULLY ALIGNED WITH THE MARKING LINE

5. SECURE BRACKET TO STUD WITH MORE NAILS

6. MOUNT PANELS INTO BRACKETS AND SECURE WITH NAILS

7. SEPARATE JOINING PANEL FROM LONG PANEL

FIG. 5

SIDING CLIP FOR SUPPORTING A PANEL

FIELD OF THE INVENTION

This invention is related to jigs and hardware used in the construction of frame buildings and particularly to a support secured to a building frame for holding a board (e.g., wallboard) in place while the board is secured to the frame. In the context of this specification, the term, "board" is understood to mean any large panel such as a sheet of plywood, fiberboard, sheetrock, plastic used to build walls by the construction industry.

BACKGROUND AND INFORMATION DISCLOSURE

Building the typical frame construction includes the operation of securing boards (wallboards) to the wooden frame. This is typically a two man operation requiring location for placement of the wallboard, and holding the wallboard in place while fasteners are applied to securing the wallboard to the vertical frame member.

A number of jigs have been disclosed for joining members, including frame members to wallboard and board members.

For example, U.S. Pat. No. 5,642,595 to Gold et al discloses a channel-like bracket for supporting a board on a horizontal frame member.

However, supports of the current art do not provide the convenience and economy of enabling a single journeyman to secure a course of wallboards on vertical frame members.

SUMMARY OF THE INVENTION

It is an object of this invention to provide a bracket and method for supporting each board of a course of boards secured in a row on vertical studs of a frame. A further object is that the method be practiced by a single journeyman thereby reducing the cost of the operation. It is contemplated that the method be characterized as enabling the journeyman to secure the boards in a straight line.

This invention is directed toward a bracket including a short channel comprising two side panels and a joining panel. The joining panel has two elongated parallel edges, one said edge joined to an edge of one side panel and another edge joined to an edge of the other side panel. One side panel (the "long side") is longer than the other said side panel ("short side").

The long side has several apertures through which fasteners (nails) are positioned for securing the bracket against a vertical surface such as a vertical stud of a frame of studs. Each bracket has a punched out nailer sticking out from the approximate center of the joining panel and in a direction away from the side panels. The bracket is first secured to the frame by hammering the "punched out nailer" into the frame member thereby holding the bracket in place until nails are hammered into the frame member through the apertures in the bracket to secure the bracket more firmly.

In one embodiment, a line of perforations is formed in the joining panel proximal and parallel to the corner of the bracket where the long side panel joins the joining panel. The joining panel can be separated from the long panel by bending the bracket along the line of perforations.

According to the method of the invention for mounting the course of panels, a bracket is mounted on each vertical stud of the frame thereby forming a horizontal line of brackets. Care is taken to mount the brackets on a straight line before the panels are mounted thereby ensuring that the line of panels will be straight. Each bracket is held against its respective stud by driving the "punched out nailer" into the respective stud. After checking to confirm that the brackets are accurately aligned, the bracket is more firmly secured by pounding nails through the apertures into the surface of the respective stud.

BRIEF DESCRIPTION OF THE DRAWINGS

FIG. 1b is a side view of FIG. 1a.

FIG. 5 is a flow chart listing the steps in mounting the board.

DESCRIPTION OF A BEST MODE

Figure 1A:
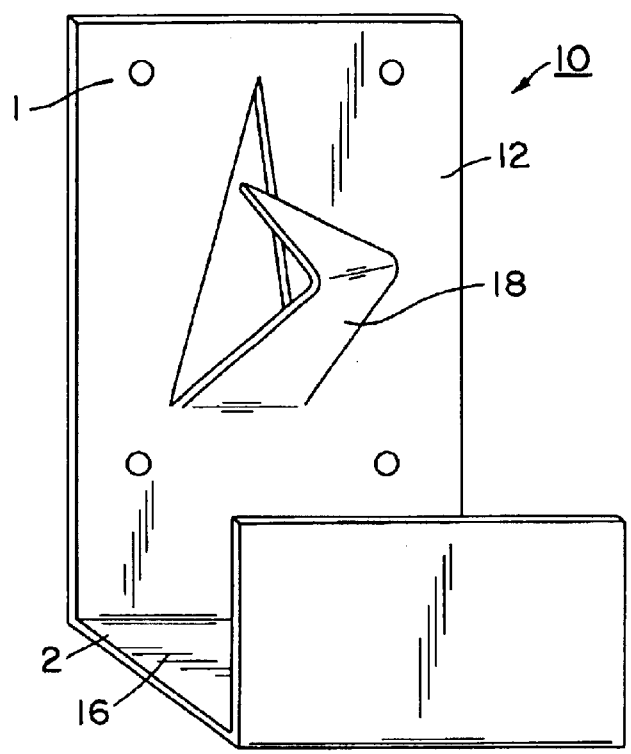
FIG. 1a is a perspective view of the bracket of this invention.

Turning now to a discussion of the drawings, FIG. 1 shows the bracket 10 of this invention including a long panel 12 and a short panel 14 joined to opposite edges of a joining panel 16. A punched out nailer 18 is shown extending perpendicularly from long panel 12.

The nailer is formed near a center of said long panel, and is a triangular area with one triangle edge joined to the long panel and bent angularly toward the short panel. A corner of the triangle opposite the triangle edge is bent toward the long panel.

An array of holes 20 (four are shown) through wide side 12. A line of perforations 22 is shown in the joining panel close to the long panel. The perforations permit the joining panel to be readily separated from the long panel 12 after the long panel 12 is nailed to a vertical stud and the wall board has been placed on the bracket and nailed to the stud. Therefore, the remaining panel is hidden from view after the wallboard is mounted.

Figure 1B:
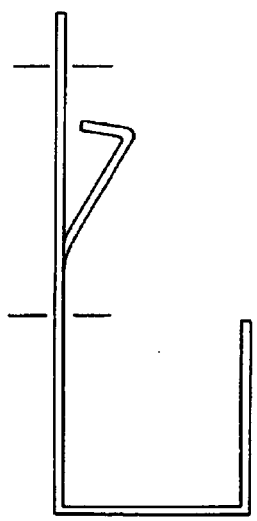

FIG. 1b is a side view of FIG. 1a.

Figure 2:
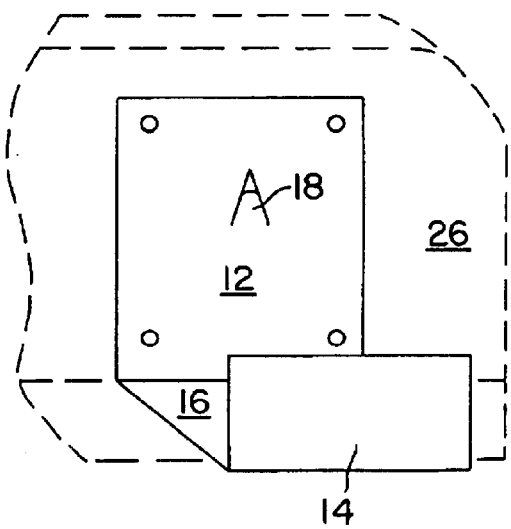
FIG. 2 shows the bracket of FIG. 1 mounted on a stud with the "punched out nailer" pounded into the stud to hold the bracket until nails are pounded into the stud through holes in the bracket to provide additional support.

FIG. 2 shows the bracket 10 secured to a vertical stud 24. The board 26 is shown in phantom supported by the bracket 10

Figure 3:
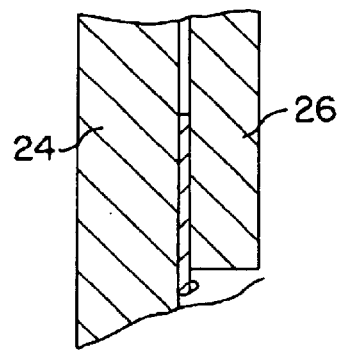
FIG. 3 shows a board mounted in the bracket with the short panel and joining panel broken away from the long panel which is between the board and the stud.

FIG. 3 is a sectional view showing a board 26 secured to stud 24 mounted in the bracket 10 with the short panel and joining panel stripped away from the long panel. The long panel 12 is shown between the vertical stud 24 and the board 26.

Figure 4:
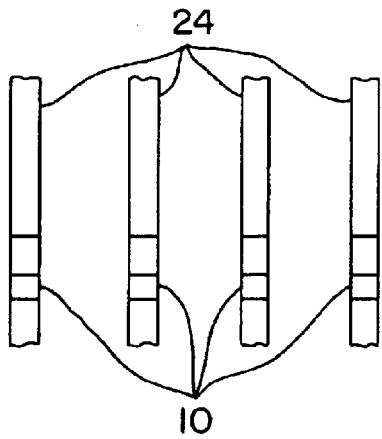
FIG. 4 shows a line of studs of a frame with a mounting bracket secured to each stud preparatory to mounting a row of boards in the brackets.

FIG. 4 shows a line of vertical studs 24 of a frame with a mounting bracket 10 secured to each stud 24 preparatory to mounting a row of boards in the brackets. The brackets are aligned in a straight horizontal line using an appropriate aligning means such as a "snap line" or laser beam.

FIG. 5 is a flow chart listing the steps in mounting the row of boards.

In step 1, a plurality of brackets 10 is provided as illustrated in FIG. 1.

In step two, the line of vertical studs is erected being a part of the building frame.

In step three, a pair of nails is partially driven into the studs, one of the nails into a stud on one end of the row of studs opposite a nail driven into another stud on an opposite end of the row of studs. A chalked line having one end attached to one of the nails is stretched and secured to the other nail. The chalk line is "snapped" to form a chalk line on the row of studs.

In step four, a bracket is mounted on each stud with the joining panel of the bracket aligned with the chalk line. Each bracket is held temporarily by driving the punched out nailer of each bracket into the respective stud.

In step five; each bracket is secured more firmly to its respective stud by driving a nail through each aperture in the bracket 10 and into the respective stud.

In step six, the row of panels is mounted onto the frame by inserting each channel into the channels of the brackets and nailing the board to the abutting studs.

In step seven, the joining panel and short panel of each bracket are separated from the long panel of the bracket by bending and snapping the bracket along the perforated line leaving the row of panels secured to the vertical row of studs.

Variations and modification may be contemplated which are within the scope of the invention.

Figure 6:
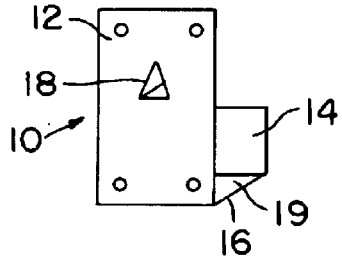
FIG. 6 shows an embodiment for hanging heavy boards where the joining panel is retained as a permanent part of the structure.

For example, FIG. 6 shows an embodiment of the bracket which is useful for hanging heavy panels such as large pictures in which the line of perforations 19 is formed in the joining panel parallel to and proximal to the short panel of the channel. In the use of this bracket, the joining side permanently supports the weight of the panel. This adaptation is especially useful for supporting heavy picture frames.

Figure 7:
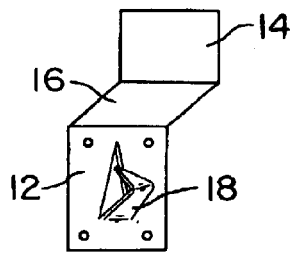
FIG. 7 shows another embodiment of the invention where the bracket is completely removable from the stud after the board has been secured to the stud.

FIG. 7 shows an embodiment in which the bracket is formed with the long panel extending away from the joining panel in a direction opposite from the short panel. The punched out nailer 18 supports the entire weight of the board until it is secured to the stud by additional fasteners through the board and into the stud. Once the board is secured to the stud, the entire bracket is detached from the stud. This embodiment requires no perforated line since any separation of the short panel from the joining panel is performed.

Figure 8:
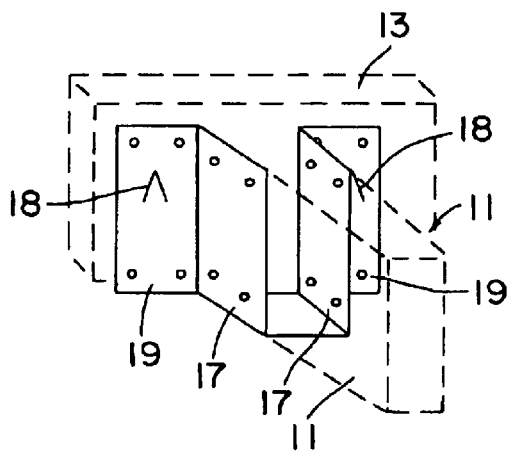
FIG. 8 shows an alternate design of a punched out nailer.

FIG. 8 shows an alternate design using a punched out nailer for holding an end of a one structural member 11 (in phantom) abutting another structural member 13 (in phantom). The bracket of this invention includes two side panels 17 joined by joining panel 16, Each side panel 17 has a flange 19 with a nailer 18. The nailers 18 are hammered into one structural member 11 and the second structural member is supported by the joining panel between side panels 17.

While the above illustration is related to the use of the bracket of this invention for the purpose of hanging a row of wallboards on studs, it will be understood that the invention has application in the general area of supporting "panel or stud shaped" objects against a vertical surface.

In view of these various embodiments which are within the scope of the invention, it is therefore desired to define the scope of the invention by the appended claims.

What is claimed is:

1. A method for securing a row of wallboards to a row of studs of a structural frame which includes the steps;

providing a plurality of brackets wherein each bracket includes a channel having a joining panel with one edge joined to an edge of a long panel extending perpendicularly away from said joining panel and said joining panel having another edge joined to an edge of a short panel extending perpendicularly away from said joining panel, said long panel having an array of holes and a nailer, said nailer formed near a center of said long panel, having a triangular shape with one triangle edge joined to said long panel and bent angularly toward said short panel and said triangle having a corner opposite said triangle edge bent toward said long panel;

(b) erecting a line of vertical studs being a part of the building frame;

(c,) forming a mark on each stud indicating a line on the row of studs where a bottom edge of each wall board is to be supported;

(d) mounting one of said brackets on each stud with the joining panel of the bracket aligned with said mark on the respective stud, and driving said punched out nailer of each bracket into said respective stud;

(e) driving a nail through each hole in each bracket 10 and into the respective stud;

(f) inserting said row of wallboards into said channels and nailing each wallboard to the respective stud;

(g) separating said joining panel and said short panel from said long panel by bending and snapping said joining panel along a perforated line.

2. A bracket for supporting a wallboard in place against a vertical surface of a structural member which comprises:

a channel being a joining panel having one edge joined to an edge of a long panel extending perpendicularly away from said joining panel and said joining panel having another edge joined to an edge of a short panel extending perpendicularly away from said joining panel;

said long panel having a surface with an array of holes;

said long panel having a nailer approximately in a center of said long panel;

said nailer being a partially punched out triangular area of said long panel;

said triangular area having one side joined to said long panel and bent along said, side toward said short panel;

said triangular area having a pointed corner opposite said one side;

a line of perforations in said joining panel parallel to and adjacent to said edge of said joining panel and adapted to enable breaking and separating said joining panel from said long panel by bending said joining panel along said line of apertures;

said bracket operably arranged to permit securing said long panel against said vertical surface by first placing said long panel against said vertical surface and driving, said corner of said punched out nailer into said vertical surface so that said long panel is secured flush against said vertical surface and then driving a nail through each said hole into said vertical surface thereby enabling placing said wall board on said joining panel in place against said vertical surface.

* * * * *